(12) United States Patent
Schulz et al.

(10) Patent No.: US 9,709,180 B2
(45) Date of Patent: Jul. 18, 2017

(54) DIRECTIONAL POPPET VALVE

(71) Applicant: Hydac Fluidtechnik GmbH, Sulzbach/Saar (DE)

(72) Inventors: Frank Schulz, Blieskastel-Bierbach (DE); Markus Bill, Heusweiler (DE)

(73) Assignee: HYDAC FLUIDTECHNIK GMBH, Sulzbach/Saar (DE)

( * ) Notice: Subject to any disclaimer, the term of this patent is extended or adjusted under 35 U.S.C. 154(b) by 25 days.

(21) Appl. No.: 13/261,910

(22) PCT Filed: Nov. 21, 2012

(86) PCT No.: PCT/EP2012/004824
§ 371 (c)(1),
(2) Date: May 29, 2014

(87) PCT Pub. No.: WO2013/091760
PCT Pub. Date: Jun. 27, 2013

(65) Prior Publication Data
US 2014/0352826 A1 Dec. 4, 2014

(30) Foreign Application Priority Data
Dec. 23, 2011 (DE) .................. 10 2011 122 349

(51) Int. Cl.
*F16K 11/07* (2006.01)
*F16K 11/20* (2006.01)
*F15B 13/04* (2006.01)

(52) U.S. Cl.
CPC .......... *F16K 11/07* (2013.01); *F15B 13/0405* (2013.01); *F16K 11/207* (2013.01);
(Continued)

(58) Field of Classification Search
CPC .. F16K 11/07; F16K 11/0712; F16K 11/0704; F16K 11/048; F16K 11/161;
(Continued)

(56) References Cited

U.S. PATENT DOCUMENTS 616,197 A * 12/1898 Moller ................ F15B 13/0417
137/596
1,105,947 A * 8/1914 Woods ............... B60G 17/0525
137/596.2

(Continued)

FOREIGN PATENT DOCUMENTS

DE 29 396 B1 7/1964
DE 11 94 663 B 2/1966
(Continued)

OTHER PUBLICATIONS

DE 1194663, Rudolf Nill, Improvements in Double Beat Lift Valves, Oct. 30, 1961, machine translation.*

Primary Examiner — Craig Schneider
Assistant Examiner — Kelsey Rohman
(74) Attorney, Agent, or Firm — Wenderoth, Lind & Ponack, L.L.P.

(57) ABSTRACT

A directional poppet valve (10) has valve pistons (16-22) arranged in a valve housing (12) for controlling a plurality of fluid connections (A, B, P, T). The positions of each valve pistons (16-22) in the valve housing (12) can be changed by at least one actuating device. The fluid connections (A, B, P, T) are connected to one another or separated from one another alternately depending on the position of the valve pistons (16-22). The valve pistons (16-22) are arranged inline along at least one axis (R), consecutively and/or at least such as to partially interengage, in the valve housing (12).

5 Claims, 1 Drawing Sheet

(52) U.S. Cl.
CPC .................. *Y10T 137/86686* (2015.04); *Y10T 137/86694* (2015.04); *Y10T 137/86831* (2015.04); *Y10T 137/87241* (2015.04)

(58) Field of Classification Search
CPC ......... F15B 13/0405; Y10T 137/86686; Y10T 137/86694; Y10T 137/86702; Y10T 137/87241
USPC ............ 137/625.68, 625.65, 625.27, 625.67, 137/596–596.2, 627.5
See application file for complete search history.

(56) References Cited

U.S. PATENT DOCUMENTS

| | | | | |
|---|---|---|---|---|
| 2,671,433 A * | 3/1954 | Meddock | ................ | F15B 13/04 137/596.2 |
| 3,599,672 A * | 8/1971 | Baghuis | .................. | F16K 11/07 137/625.48 |
| 3,701,366 A * | 10/1972 | Tirelli | .................... | F16K 11/07 137/625.65 |
| 4,691,730 A * | 9/1987 | Portolese | ............... | G05D 11/02 137/101 |
| 5,103,866 A * | 4/1992 | Foster | ................. | F15B 13/0405 137/596.15 |
| 5,184,643 A * | 2/1993 | Raymond | ............... | F16K 11/07 137/625.48 |
| 5,601,116 A * | 2/1997 | Sell | ........ | F16K 11/044 137/596.18 |
| 5,899,232 A * | 5/1999 | Cardoso | ................ | F16K 11/048 137/625.5 |
| 8,132,588 B1 * | 3/2012 | Langenfeld | ........... | F16K 11/048 137/100 |
| 2003/0221730 A1 * | 12/2003 | Porter | ................... | F15B 11/123 137/625.64 |
| 2010/0032036 A1 * | 2/2010 | Quendt | ................ | F16K 11/044 137/625.4 |
| 2011/0193000 A1 * | 8/2011 | Miyazoe | ............... | F15B 11/064 251/129.01 |
| 2014/0352826 A1 * | 12/2014 | Schulz | ................ | F15B 13/0405 137/625.42 |

FOREIGN PATENT DOCUMENTS

| | | |
|---|---|---|
| DE | 17 50 092 A | 1/1971 |
| JP | 34-2179 | 3/1957 |
| WO | 2011/090855 | 7/2011 |

* cited by examiner

DIRECTIONAL POPPET VALVE

FIELD OF THE INVENTION

The invention relates to a directional poppet valve, comprising valve pistons disposed in a valve housing for controlling a plurality of fluid connections. The positions of each of the valve pistons in the valve housing can be changed by means of at least one actuation device. The fluid connections are alternately connected with one another or separated from one another depending on the placements of the valve pistons.

BACKGROUND OF THE INVENTION

Directional poppet valves are known in different structural designs. In known directional valves, the poppet valve cartridge cannot be fully force balanced, which results in a loss of performance and the need for increased actuation forces. Sometimes the structural design of the known directional poppet valves is so costly and prone to failure that complicated actuation mechanisms and a complicated drilling path in the block must be implemented for the actuation. In addition, a defined opening of control edges as well as a positive or negative overlap of control edges is only possible with great difficulty or is not possible at all. In addition, in known directional poppet valves, the fluid pressures must be selected such that the pump pressure in the supply connection exceeds the consumer load pressure in the respective utility connection, and this load pressure in turn must exceed the tank pressure in the tank connection.

SUMMARY OF THE INVENTION

An object of the invention is to provide an improved directional poppet valve that is as force balanced as possible, that can be actuated in a simple manner and with low actuation forces, and that has improved control functions.

This object is basically achieved by a directional poppet valve having piston valves disposed in an inline construction, one after the other along at least one axis and/or in the valve housing such that they at least partially interengage.

According to the invention, two or more valve pistons are disposed in the piston chamber, which chamber extends along the at least one axis in the valve housing. The valve pistons may be moved or displaced along the respective axis. The respective actuation device provided for this purpose may be designed for electric actuation, for example as an electromagnet or as a step or linear motor, respectively, or may be designed for mechanical actuation or for manual actuation. In addition, the directional poppet valve according to the invention may be operated by proportional and/or switching magnets, or in other words, the respective valve piston may be actuated in such manner.

The arrangement of the valve pistons according to the invention makes possible a simple production and a compact design of the directional poppet valve according to the invention. An at least partial interengagement of each of a plurality, typically two valve pistons, allows the installation space, or more precisely the piston chamber provided in the valve housing, to be designed such that it is smaller in comparison with conventional solutions. Depending on the intended use of the directional poppet valve according to the invention, this valve may be designed as a 3/2-directional poppet valve, as a 4/2-directional poppet valve or as a 4/3-directional poppet valve for example. Due to the comparatively short adjustment or actuating travel of the respective valve piston, the respective, for example three or four, fluid connections corresponding to the desired switch positions may be connected to one another such that they can carry fluid, or may be separated from one another such in a fluid-tight manner.

In a preferred embodiment of the directional poppet valve according to the invention, the piston valves interengage in pairs. Preferably, each piston is disposed between two seats, and can be moved relative to one another by a respective resetting device, preferably in the direction of one respective seat. The advantage of this embodiment lies in the fact that, when viewed in the direction of the axis, the piston valves can be disposed in a short piston chamber in a space-saving manner. The resetting device allows the piston valves to be moved towards and apart from one another, so that in the non-actuated state, i.e., without the application of an actuation force by the respective actuation device, the piston valves abut the respective seats thereof. The resetting device allows the contact force, or the contact pressure, respectively, to be specified for the respective valve piston at the respective seat.

The piston valves and/or the associated seats are each formed such that they are essentially rotationally symmetrical to the axis. The valve pistons may each be designed as conical pistons. This shape provides the advantage of a particularly cost-effective implementation of the directional poppet valve according to the invention. Especially preferably, the seat for the respective valve piston may be formed as an annular surface that is disposed transverse, preferably perpendicular, to the axis. With that annular surface, the dedicated end face of the respective valve piston allocated thereto may be in contact, typically with a contact force applied by the respective resetting device.

At least one tank connection, at least one supply connection and at least one utility or consumer load connection may be provided as valve connections. The fluid connections are connected to the piston chamber encompassing the valve pistons in a fluid-conveying manner, and are typically each designed as at least one through bore in the valve housing. The fluid connections of the through bores are advantageously disposed such that they extend radially to the axis, which ensures a simple structural design and simple fabrication of the directional poppet valve according to the invention.

In an additional preferred embodiment of the directional poppet valve according to the invention, the respective actuation device comprises an actuation rod, which acts on at least one valve piston, and/or which at least partially passes through this valve piston. A particularly simple and compact design results when the at least one actuation rod extends along, or parallel to, the axis, so that complicated constructive actuation mechanisms may be omitted. The actuation force is transferred to the respective valve pistons by the respective actuation rod. These valve pistons are moved linearly, accordingly, in the selected direction along the axis. In the case of an actuation of this kind, the corresponding valve piston or pistons is or are spaced away from the respective seat and the corresponding fluid connection is opened. In so doing, the reset force, which is exerted by the respective resetting device on the respective valve piston for movement in the direction of the respective seat, must typically be overcome. Once the actuation is complete, the valve piston is guided back to, and placed in contact with, the respective seat by the reset force exerted by the resetting device, which is typically designed as a spring element.

The respective actuation rod is advantageously guided in the respective valve piston. At least one actuator, which actuates at least one valve piston, is disposed on the respective actuation rod. That design of the directional poppet valve according to the invention is especially advantageous when a plurality of, for example, two valve pistons are actuated by a shared actuation rod. In the case of two valve pistons, which interengage as a pair, the actuation rod is typically guided through both valve pistons and has a first or front actuator and a second or rear actuator. Depending on the direction of movement of the actuation rod relative to the valve piston, each actuator abuts a first or front side respectively, or a second or rear side, respectively, of the pair, or of the respective valve piston. The actuators are fixedly attached to the actuation rod or connected thereto respectively, so that an actuation force can be transferred from the actuation rod to the respective valve piston by the actuator.

In an additional preferred embodiment of the invention, the actuation rods associated with the respective valve pistons are disposed in the valve housing such that they at least partially interengage. Especially preferred, a first actuator and a third actuator may be provided on an actuation rod to space first and third valve pistons away from a first or third seat, respectively. A second actuator and a fourth actuator may be provided on another actuation rod oriented in the opposing direction to space the second piston rod and the fourth piston rod away from a second seat or fourth seat, respectively. A first utility connection may be provided between the facing first and second seats for the first and second valve pistons, which interengage as a pair. A second utility connection may be provided between the facing third and fourth seats for the third and fourth valve pistons, which interengage as a pair. A supply connection or a tank connection may be provided between the second seat and the third seat. A tank connection or a supply connection, respectively, may be provided between the first seat or fourth seat, respectively, and the respective end of the valve housing.

In this embodiment, the actuation rods for a plurality of valve pistons are coupled with or to one another, respectively, such that two valve pistons are each moved or displaced upon the movement of the corresponding actuation rod, and a corresponding switch position of the directional valve is adjusted. Thus, with the actuation of the one actuation rod, a fluid connection from the supply connection to the second utility connection and an additional fluid connection from the first utility connection to the tank connection are opened. Accordingly, with the actuation of the other actuation rod, a fluid connection from the supply connection to the first utility connection and an additional fluid connection from the second utility connection to the tank connection are opened. The tank connection and supply connection may then be exchanged with one another. In a comparable arrangement, three and more utility connections may be connected to tank and supply connections. Actuation rods, which act on the valve pistons associated with the respective fluid connections or fluid ports, are then used.

According to the invention, various disclosed features may each be implemented individually or in any combination with one another.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure and that are schematic and not to scale.

DETAILED DESCRIPTION OF THE INVENTION

Figure 1:
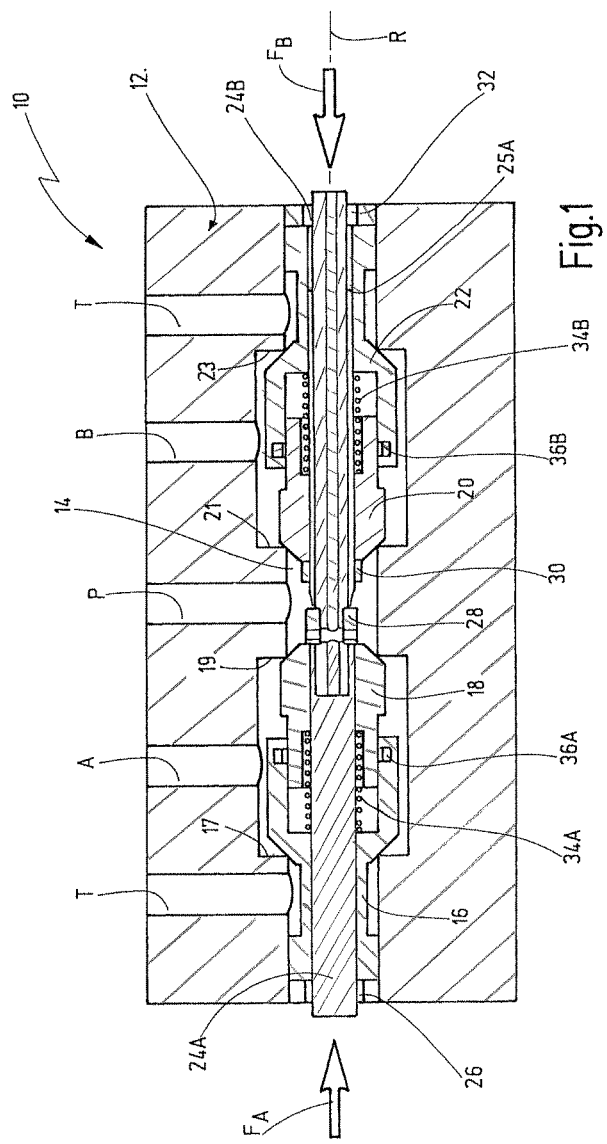
FIG. 1 is a side view in section of a directional poppet valve according to an exemplary embodiment of the invention.

FIG. 1 shows a section of a directional poppet valve 10 having a valve housing 12. In the piston chamber 14 of a valve housing 12 a first valve piston 16, a second valve piston 18, a third valve piston 20 and a fourth valve piston 22 are disposed. The piston chamber 14, having an elongated design, extends in the direction of an axis R, which simultaneously represents a rotational axis for the respective valve piston 16, 18, 20, 22. The four valve pistons 16, 18, 20, 22 are disposed in an inline construction along the axis R. The first and the second piston valves 16, 18 as well as the third and the fourth piston valves 20, 22 are each disposed such that they interengage in pairs. The two pairs of in each case two valve pistons 16, 18; 20, 22 are sequentially disposed along the axis R in the piston chamber 14.

A seat 17, 19, 21, 23 is assigned to each valve piston 16, 18, 20, 22. Each seat 17-23 is formed as an annular surface that is rotationally symmetrical to the axis R, and delimits the front end of the respective receiving section of the piston chamber 14 to receive the one pair, comprising the first and second valve pistons 16, 18, or the other pair, comprising the third and fourth valve pistons 20, 22, respectively. In the non-actuated state shown, the valve pistons 16, 18, 20, 22 each abut the respective seat 17, 19, 21, 23. The contact force needed therefor is applied in each case by a resetting device 34A, 34B, each of which is disposed within the valve pistons 16, 18; 20, 22, which interengage in pairs, and guides these valve pistons towards and away from one another to the respective valve seat 17, 19; 21, 23. An annular sealing device 36A, 36B is disposed between the valve pistons 16, 18; 20, 22 that are connected to one another in pairs.

Two actuation rods 24A, 24B are provided for the movement of the valve pistons 16-22, which actuation rods are disposed along the axis R in the piston chamber 14, and which interengage with one another in the region of the piston chamber 14. The two actuation rods 24A, 24B are each part of an actuation device (not otherwise shown), which each exert an actuation force $F_A$, $F_B$ on the respective actuation rod 24A, 24B. The actuation force is oriented in one respective direction. To transfer the actuation forces $F_A$, $F_B$ from the actuation rods 24A, 24B to the respective piston 16, 18, 20, 22, actuators 26, 28, 30, 32 are provided on the two actuation rods 24A, 24B. The front end of each of these actuators each act on the respective valve piston 16, 18, 20, 22, to space these pistons away from the respective valve seat 17, 19, 21, 23. In the embodiment shown in FIG. 1, the two pairs of valve pistons 16, 18; 20, 22 are disposed symmetrically to the (not shown) center plane of the piston chamber 14 or of the valve housing 12, respectively. By an actuation force $F_A$ directed towards the right in FIG. 1, the first valve piston 16 can be spaced apart from the first seat 17 by a first actuator 26, and the third valve piston 20 can be spaced apart from the third valve seat 21 by the third actuator 30. Accordingly, with an opposing actuation force $F_B$ directed towards the left in FIG. 1, the second valve piston 18 can be spaced apart from the second seat 16 by the second actuator 28, and the fourth valve piston 22 can be spaced apart from the fourth seat 23 by the fourth actuator 32. The first and third actuators 26, 30 are disposed on the one actuation rod 24A shown on the left in FIG. 1. The second and fourth actuators 28, 32 are disposed on the other actuation rod 24B shown on the right in FIG. 1.

Figure 2:
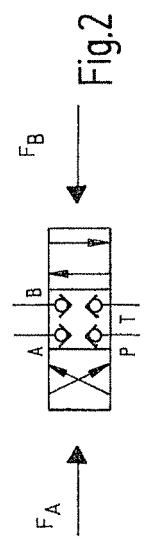
FIG. 2 a circuit diagram the directional poppet valve of FIG. 1.

A tank connection T, a first utility connection A, a supply connection P, a second fluid connection B, and in turn, a tank connection T, are formed sequentially in the valve housing 12 along the piston chamber 14, from left to right in FIG. 1. The first tank connection T and the first fluid connection A are controlled by the one pair comprising the first and second valve pistons 16, 18, and accordingly, the second utility connection B and the second tank connection T are controlled by the other pair comprising the third and fourth valve pistons 20, 22. The supply connection P, which is centrally disposed between the two pairs, is controlled by the adjacent second and third valve pistons 18, 20. In the non-actuated state, shown in FIG. 1, of the corresponding switch position of the directional poppet valve 10, respectively, all of the valve pistons 10, 18, 20, 22 abut the respective seat 17-23, whereby the fluid connections A-T are separated from one another in as fluid-tight a manner as possible. Due to the symmetrical, uniform design of the valve pistons 16, 18, 20, 22, of the valve seats 17, 19, 21, 23 as well as of the resetting devices 34A, 34B or of the respective reset force, the valve arrangement in a non-actuated state is force balanced. The non-actuated switch position of the directional poppet valve 10 is shown in the center of the circuit symbol from FIG. 2.

In the case of an actuation or movement of the one actuation rod 24A, shown on the left in FIG. 1, which movement corresponds to an actuation force $F_A$, the first and third valve pistons 16, 20 are spaced apart from the first or third seat 17, 21, respectively. Accordingly, a fluid connection from the first utility connection A to the tank connection T as well as an additional fluid connection from the supply connection P to the second utility connection B are opened. By actuating or moving the one actuation rod 24A, the resetting devices 34A, 34B are further compressed, whereby the respective contact pressure of the second and fourth valve pistons 18, 22 at the second or the forth seat 19, 23 is increased accordingly. A fluid connection from the supply connection P to the first utility connection A, as well as an additional fluid connection from the second utility connection B to the tank connection T remains blocked. The switch position of the directional poppet valve 10 that can be reached by an actuation force $F_A$ is illustrated on the left in FIG. 2. At the end of the application of an actuation force $F_A$, the two, first and third, valve pistons 16, 20 are guided back by the resetting devices 23A, 34B and abut the first or third seat 17, 21. Accordingly, in addition to the actuators 26, 28, 30, 32, the actuation rods 24A, 24B return to their respective placement or position in the non-actuated state.

In the case of an actuation or movement of the other actuation rod 24B shown on the right in FIG. 1, the second and fourth valve pistons 18, 22 are spaced apart from the second and fourth seat 19, 23. Accordingly, a fluid connection from the supply connection P to the first utility connection A, and an additional fluid connection from the second utility connection B to the tank connection T, are opened. By actuating the other actuation rod 24B, the resetting devices or resetters 34A, 34B are compressed and consequently the respective contact pressure of the first and third valve pistons 16, 20 at the first or third seats 17, 21, respectively, are increased. Also, the corresponding fluid connections, from the first utility connection A to the tank connection T, as well as from the supply connection P to the second utility connection B, are blocked. The switch position of the directional poppet valve 10, corresponding to the actuation of the other actuation rod 24B with the other actuation force $F_B$, is shown on the right in FIG. 2. As can be readily observed in FIG. 2, the directional poppet valve 10 is a 4/3-directional poppet valve having three switch positions for fluid connections between four fluid connections A, B, P, T. At the end of the application of the other actuation force $F_B$, the two, second and fourth, valve pistons 18, 22 are guided back by the resetting devices 34A, 34B and abut the second and fourth seat 19, 23. Accordingly, in addition to the actuators 26, 28, 30, 32, the actuation rods 24A, 24B return to their respective placement or position in the non-actuated state.

The directional poppet valve 10 shown in FIG. 1 is a directly controlled valve. A pilot-controlled design of the directional poppet valve 10 according to the invention is also possible. The fluid pressure available at the supply connection P is typically present in the interior of the valve pistons 16, 18, 20, 22, which interengage in pairs, of the interengaging or meshing actuation rods 24A, 24B respectively, and of the actuation devices (not otherwise shown). Depending on the position of the actuators 26, 28, 30, 32, a positive or negative overlap of the control edges may be achieved. In addition, a tolerance compensation may be achieved by the actuators 26, 28, 30, 32 such that in a non-actuated state or in other words, in the central position, all valve pistons 16, 18, 20, 22 abut the respective seats 17, 19, 21, 23 and block the corresponding fluid connections. Depending on the requirements, additional sealing devices may be formed on the valve pistons 16, 18, 20, 22. In the embodiment shown, the one actuation rod 24A encompasses the other actuation rod 24B up to the end of the rod 25A on the opposing end of the piston chamber 14. Accordingly, the other actuation rod 24B extends into the one actuation rod 24A, wherein the corresponding end of the rod is not shown in FIG. 1.

While one embodiment has been chosen to illustrate the invention, it will be understood by those skilled in the art that various changes and modifications can be made therein without departing from the scope of the invention as defined in the claims.

The invention claimed is:

1. A directional poppet valve, comprising:
 a valve housing having first, second, third and fourth valve connections and having first, second, third and fourth valve seats;
 first, second, third and fourth valve pistons movably disposed in said valve housing and controlling said first, second, third and fourth valve connections, respectively, said valve pistons being in sequence one after another along an axis and being interengaged in first and second pairs of said first and second valve pistons and said third and fourth valve pistons, respectively, each of said pairs being disposed between two of said valve seats;
 first and second actuating rods being axially movable in said valve housing along said axis and extending through said valve pistons with each of said valve pistons being axially movable and guided on said actuating rods along said axis, said first and second valve pistons being on said first actuating rod, said third and fourth valve pistons being on said second actuating rod, said first and second actuating rods at least partially intermeshing one another in said valve housing for independent movement thereof, with each of said actuating rods forming part of an actuation device exerting an actuation force in one of two opposite directions on each of the respective actuating rods;

first, second, third and fourth piston actuators, said first and second piston actuators being fixed on said first actuating rod and contacting to move said first and second valve pistons from said first and second valve seats, respectively, said third and fourth piston actuators being fixed on said second actuating rod and contacting to move said third and fourth piston valves from said third and fourth valve seats, respectively, said first and second valve pistons being between said first and second piston actuators limiting axial movement of said first and second valve pistons relative to said first actuating rod, said third and fourth valve pistons being between said third and fourth piston actuators limiting axial movement of said third and fourth valve pistons relative to said second actuating rod; and first and second resetters coupled to said valve pistons of said first and second pairs, respectively, and biasing each said valve piston toward a respective one of said valve seats, each said resetter being in a chamber in the respective piston valves interengaging with each other, each said valve piston engaging the respective valve seat under biasing of the respective setter in a non-actuated and central position of said actuating rods.

2. A directional poppet valve according to claim 1, wherein
said piston valves and said valve seats are each essentially rotationally symmetrical relative to said axis.

3. A directional poppet valve according to claim 1 wherein
said valve connections comprises a tank connection, a supply connection and a utility connection.

4. A directional poppet valve according to claim 1
said first valve connection is a first utility connection between said first and second valve seats, said first and second valve seats facing one another and being releasably engaged by said first and second valve pistons, respectively;

said third valve connection forming a second utility connection between said third and fourth valve seats, said third and fourth valve seats facing one another and being releasably engaged with said third and fourth valve pistons, respectively;

a second valve connection is one of a supply connection or a tank connection and is between said second and third valve seats; and said fourth valve connection is a one of a supply connection or a tank connection and is between one of said first and fourth valve seats and an end of said valve housing.

5. A directional poppet valve according to claim 1 wherein
said first and second actuating rods have opposite exposed ends outside said valve housing receiving forces in the opposite directions by said actuation device.

* * * * *